United States Patent
Takahashi

(10) Patent No.: US 7,709,156 B2
(45) Date of Patent: May 4, 2010

(54) NON-AQUEOUS ELECTROLYTE SECONDARY BATTERY

(75) Inventor: Kentaro Takahashi, Moriguchi (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 0 days.

(21) Appl. No.: 12/238,772

(22) Filed: Sep. 26, 2008

(65) Prior Publication Data

US 2009/0087752 A1    Apr. 2, 2009

(30) Foreign Application Priority Data

Sep. 28, 2007  (JP) .............................. 2007-254283

(51) Int. Cl.
*H01M 6/16*   (2006.01)

(52) U.S. Cl. ................. 429/332; 429/330; 429/343; 429/231.1; 429/231.6; 429/231.5; 429/218.1; 429/231.3; 429/231.8; 429/231.4

(58) Field of Classification Search ............. 429/332, 429/330, 343, 231.1, 231.6, 231.5, 218.1, 429/231.3, 231.8, 231.4
See application file for complete search history.

(56) References Cited

U.S. PATENT DOCUMENTS

| 6,881,522 | B2 * | 4/2005 | Hamamoto et al. ......... 429/332 |
| 2004/0142240 | A1 | 7/2004 | Nagayama et al. |
| 2006/0078795 | A1 * | 4/2006 | Takahashi et al. ......... 429/231.3 |
| 2007/0082271 | A1 | 4/2007 | Abe et al. |
| 2007/0254215 | A1 | 11/2007 | Morikawa et al. |

FOREIGN PATENT DOCUMENTS

| JP | 2004-220952 A | 8/2004 |
| JP | 2005-340080 A | 12/2005 |
| JP | 2006-32301 A | 2/2006 |
| JP | 2006-100262 A | 4/2006 |
| WO | 2005/048391 A1 | 5/2005 |

* cited by examiner

*Primary Examiner*—Laura S Weiner
(74) *Attorney, Agent, or Firm*—Westerman, Hattori, Daniels & Adrian, LLP

(57) ABSTRACT

A non-aqueous electrolyte secondary battery includes a positive electrode containing a positive electrode active material; a negative electrode containing a negative electrode active material; and a non-aqueous electrolyte containing a non-aqueous solvent and an electrolyte salt. In order to improve the high-temperature storage characteristics and safety against overcharge due to high-rate charging of the battery, the positive electrode active material contains a layered lithium-transition metal composite oxide containing at least one of Mg, Al, Ti, and Zr. Furthermore, the non-aqueous electrolyte contains 3 to 80% by mass of a tertiary carboxylic acid ester expressed by Chemical Formula 2 below, based on the total mass of the non-aqueous solvent:

Chemical Formula 2

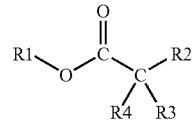

where R1 to R4 are independent of each other and each represents an alkyl group having 4 or less carbon atoms and being able to be branched.

8 Claims, No Drawings

NON-AQUEOUS ELECTROLYTE SECONDARY BATTERY

BACKGROUND OF THE INVENTION

1. Field of the Invention

The present invention relates to non-aqueous electrolyte secondary batteries having excellent high-temperature storage characteristics, high overcharge safety, and other advantageous characteristics.

2. Description of the Prior Art

Non-aqueous electrolyte secondary batteries have been widely used as the driving power sources of portable devices because of their high energy density and high capacity. In recent years, such batteries have also been used as the driving power sources of electric tools, electric vehicles, hybrid vehicles, and the like. In such uses, non-aqueous electrolyte secondary batteries are likely to be used and stored in a hot environment and to be charged at a high rate. Therefore, these batteries are required to have excellent high-temperature storage characteristics and to ensure safety against overcharge due to high-rate charging.

Conventional non-aqueous electrolyte secondary batteries use as a positive electrode active material a lithium-cobalt composite oxide (a lithium cobalt oxide). The use of the lithium-cobalt composite oxide, however, has a problem that a non-aqueous solvent reacts with the positive electrode and is decomposed to generate gas, thereby reducing the safety of the battery. To solve this problem, a different element (such as Zr or Mg) is added to the lithium-cobalt composite oxide so as to improve the structure stability of the positive electrode active material. This technique, however, is not enough to solve the problem.

Such conventional techniques related to non-aqueous electrolyte secondary batteries are disclosed in the following Patent Documents 1 to 5.

Patent Document 1: WO05/048391

Patent Document 2: Japanese Patent Unexamined Publication No. 2004-220952

Patent Document 3: Japanese Patent Unexamined Publication No. 2005-340080

Patent Document 4: Japanese Patent Unexamined Publication No. 2006-32301

Patent Document 5: Japanese Patent Unexamined Publication No. 2006-100262

The technique of Patent Document 1 uses a non-aqueous solvent containing a cyclic carbonate compound, a chain carbonate compound, or a cyclohexylbenzene compound in which one or two halogen atoms are bonded to a benzene ring. Patent Document 1 says this technique provides a battery having high overcharge safety and excellent cycle characteristics.

The technique of Patent Document 2 uses as a positive electrode active material a composite oxide expressed by $Li_zCO_{1-x-y}Mg_xM_yO_2$ where M is at least one of Al, Ti, Sr, Mn, Ni, and Ca. Patent Document 2 says this technique provides a battery having excellent heat resistance during overcharge.

The technique of Patent Document 3 uses a non-aqueous electrolytic solution containing a compound expressed by Chemical Formula 1 below. Patent Document 3 says this technique provides a battery excellent in cycle characteristics, capacitance, and storage characteristics.

Chemical Formula 1

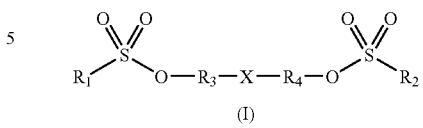

where R1 and R2 are independent of each other and each represents an alkyl group having 1 to 6 carbon atoms and being able to be branched; R3 and R4 each represents either a non-substituted methylene group or a methylene group containing an alkyl group having 1 to 4 carbon atoms; and X represents a vinylene group, a 2-butenylene group, or a 1,3-butadienylene group.

The technique of Patent Document 4 uses a non-aqueous solvent containing a carboxylic acid ester or a ketone in which a third alkyl group is directly bonded to a carbonyl group. Patent Document 4 says this technique provides a battery having excellent cycle characteristics.

The technique of Patent Document 5 uses a non-aqueous electrolytic solution containing a hydrogenated terphenyl. Patent Document 5 says this technique provides a battery having high safety against overcharge.

All these techniques, however, are still not sufficient in high-temperature storage characteristics or safety against overcharge due to high-rate charging.

SUMMARY OF THE INVENTION

In view of the aforementioned problem, an object of the present invention is to provide a non-aqueous electrolyte secondary battery having excellent high-temperature storage characteristics and high safety against overcharge due to high-rate charging.

A non-aqueous electrolyte secondary battery according to a first aspect of the present invention includes:

a positive electrode containing a positive electrode active material;

a negative electrode containing a negative electrode active material; and a non-aqueous electrolyte containing a non-aqueous solvent and an electrolyte salt, wherein the positive electrode active material contains a layered lithium-transition metal composite oxide containing at least one element selected from the group consisting of Mg, Al, Ti, and Zr; and the non-aqueous electrolyte contains 3 to 80% by mass of a tertiary carboxylic acid ester expressed by Chemical Formula 2 below, based on the total mass of the non-aqueous solvent.

Chemical Formula 2

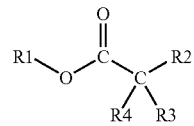

where R1 to R4 are independent of each other and each represents an alkyl group having 4 or less carbon atoms and being able to be branched.

In this structure, the different element (Mg, Al, Ti, or Zr) contained in the layered lithium-transition metal composite oxide improves the stability of the positive electrode active material. Furthermore, the tertiary carboxylic acid ester contained in the non-aqueous electrolyte reduces the reaction between the non-aqueous electrolyte and the positive electrode active material to which the different element has been added. These effects act synergistically so as to dramatically improve the high-temperature storage characteristics and the safety against overcharge due to high-rate charging.

The content of the tertiary carboxylic acid ester is preferably within the aforementioned range. The reason for this is that when the content is too low, the effect is insufficient, whereas when the content is too high, the tertiary carboxylic acid ester reacts with the electrode and is decomposed, thereby reducing the safety against overcharge due to high-rate charging.

Preferable examples of the tertiary carboxylic acid ester are methyl trimethylacetate and ethyl trimethylacetate because of their high effect per unit mass.

The layered lithium-transition metal composite oxide is preferably at least one selected from the group consist of a lithium-cobalt composite oxide, a lithium-nickel composite oxide, a lithium-cobalt-nickel composite oxide, a lithium-manganese-nickel composite oxide, and a lithium-cobalt-manganese-nickel composite oxide because of their excellent discharge characteristics.

The total amount of the different element contained in the layered lithium-transition metal composite oxide is preferably 0.005 to 0.8 mol % based on the total mole number of the transition metal and the different element contained in the layered lithium-transition metal composite oxide. The reason for this is that when the amount is too low, the effect is insufficient, whereas when the amount is too high, it reduces the structure stability of the positive electrode active material.

To obtain the full effect of the present invention, the positive electrode active material contains preferably at least 10% by mass, more preferably at least 50% by mass, and most preferably at least 80% by mass of the layered lithium-transition metal composite oxide based on the total mass of the positive electrode active material. The mass ratio of the layered lithium-transition metal composite oxide in the positive electrode active material has an upper limit of 100% by mass.

The layered lithium-transition metal composite oxide is preferably in the form of spherical or elliptical particles.

The non-aqueous solvent preferably contains a cyclic carbonate.

The negative electrode active material is preferably graphite the surface of which has been non-crystallized.

EFFECT OF THE INVENTION

As described hereinbefore, the present invention provides a non-aqueous electrolyte secondary battery having excellent high-temperature storage characteristics and high safety against overcharge due to high-rate charging.

DETAILED DESCRIPTION OF THE INVENTION

The best mode of the present invention is described in detail as follows using examples. It should be understood, however, that the invention is not limited to these examples and can be implemented in various forms within the scope of the invention.

Example 1

Production of the Positive Electrode

First, lithium carbonate, a tricobalt tetroxide, and a zirconium oxide were mixed together, sintered for 24 hours in air atmosphere of 950° C., and crushed to obtain a zirconium-containing lithium-cobalt composite oxide $LiC_{0.9985}Zr_{0.0015}O_2$).

The zirconium content was measured using inductively-coupled plasma. The crystal structure of the zirconium-containing lithium-cobalt composite oxide was measured using an X-ray diffractometer to confirm that the composite oxide had a layered structure.

Further, also in the following examples and comparative examples, each of the contents of the different elements (Mg, Al, Ti, Zr, Cr, Zn, Sr, Nb) was measured using inductively coupled plasma, and each of the crystal structure of the layered lithium-transition metal composite oxide was measured using an X-ray diffractometer to confirm that the composite oxide had a layered structure.

Then, 95 parts by mass of the zirconium-containing lithium-cobalt composite oxide was mixed with 3 parts by mass of acetylene black as a conductive agent, 2 parts by mass of polyvinylidene fluoride (PVdF) as a binder, and N-methyl-2-pyrrolidone (NMP) so as to prepare a positive electrode active material slurry. The slurry was applied to both sides of an aluminum positive electrode current collector having a thickness of 12 μm using a doctor blade method. The applied slurry was dried to eliminate the solvent (NMP), which was needed to prepare the slurry. Then, the obtained dry electrode plate was rolled so as to have a thickness of 120 μm, thus completing the positive electrode.

Production of the Negative Electrode

First, 95 parts by mass of artificial graphite having a d(002) value of 0.336 nm as a negative electrode active material was mixed with 5 parts by mass of polyvinylidene fluoride (PVdF) as a binder, and N-methyl-2-pyrrolidone (NMP) so as to prepare a negative electrode active material slurry. The slurry was applied to both sides of a copper negative electrode current collector having a thickness of 8 μm. The applied slurry was dried to eliminate the organic solvent, which was needed to prepare the slurry. Then, the dry electrode was rolled so as to have a thickness of 130 μm, thus completing the negative electrode.

Preparation of the Electrode Assembly

The positive electrode and the negative electrode thus produced were wound with a separator interposed therebetween so as to prepare an electrode assembly. The separator is made of polyolefin microporous film having a thickness of 16 μm.

Preparation of the Non-Aqueous Electrolyte

A non-aqueous electrolyte was prepared by mixing methyl trimethylacetate (MTMA) expressed by Chemical Formula 3 below as a non-aqueous solvent and ethylene carbonate (EC) in a mass ratio of 70:30 and then by dissolving $LiPF_6$ as an electrolyte salt therein at a concentration of 1.0 M (mol/L).

Chemical Formula 3

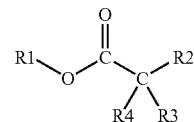

where R1 to R4 are all methyl groups.

Assembly of the Battery

The electrode assembly and the non-aqueous electrolyte were housed in an outer can, and the opening of the outer can was sealed with a sealing plate. This completes a non-aqueous electrolyte secondary battery of Example 1 having a design capacity of 950 mAh.

Example 2

A non-aqueous electrolyte secondary battery of Example 2 was prepared in the same manner as in Example 1 except that the zirconium oxide was replaced by a magnesium oxide in the preparation of the positive electrode active material.

Example 3

A non-aqueous electrolyte secondary battery of Example 3 was prepared in the same manner as in Example 1 except that the zirconium oxide was replaced by an aluminum oxide in the preparation of the positive electrode active material.

Example 4

A non-aqueous electrolyte secondary battery of Example 4 was prepared in the same manner as in Example 3 except that the amount of the aluminum oxide added was changed.

Example 5

A non-aqueous electrolyte secondary battery of Example 5 was prepared in the same manner as in Example 3 except that the amount of the aluminum oxide added was changed.

Example 6

A non-aqueous electrolyte secondary battery of Example 6 was prepared in the same manner as in Example 1 except that the positive electrode active material was prepared as follows.

Lithium carbonate, a nickel oxide, and an aluminum oxide were mixed together, sintered for 24 hours in air atmosphere of 950° C., and crushed to obtain an aluminum-containing lithium-nickel composite oxide $LiNi_{0.9985}Al_{0.0015}O_2$).

Example 7

A non-aqueous electrolyte secondary battery of Example 7 was prepared in the same manner as in Example 1 except that the zirconium oxide was replaced by a titanium oxide in the preparation of the positive electrode active material.

Example 8

A non-aqueous electrolyte secondary battery of Example 8 was measured in the same manner as in Example 1 except that the amount of the zirconium oxide added was changed.

Example 9

A non-aqueous electrolyte secondary battery of Example 9 was prepared in the same manner as in Example 1 except that not only the zirconium oxide but also a magnesium oxide was used in the preparation of the positive electrode active material.

Example 10

A non-aqueous electrolyte secondary battery of Example 10 was prepared in the same manner as in Example 1 except that not only the zirconium oxide but also a chrome oxide was used in the preparation of the positive electrode active material.

Example 11

A non-aqueous electrolyte secondary battery of Example 11 was prepared in the same manner as in Example 1 except that not only 1.0 M $LiPF_6$ but also 0.02 M $LiBF_4$ was added to the non-aqueous electrolyte.

Example 12

A non-aqueous electrolyte secondary battery of Example 12 was prepared in the same manner as in Example 1 except that not only 1.0 M $LiPF_6$ but also 0.02 M LiTFSI (lithium bis(trifluoromethansulfonyl)imide) was added to the non-aqueous electrolyte.

Example 13

A non-aqueous electrolyte secondary battery of Example 13 was prepared in the same manner as in Example 1 except that the amount of the zirconium oxide added was changed.

Example 14

A non-aqueous electrolyte secondary battery of Example 14 was prepared in the same manner as in Example 1 except that the amount of the zirconium oxide added was changed.

Comparative Example 1

A non-aqueous electrolyte secondary battery of Comparative Example 1 was prepared in the same manner as in Example 1 except that no zirconium oxide was added in the preparation of the positive electrode active material.

Comparative Example 2

A non-aqueous electrolyte secondary battery of Comparative Example 2 was prepared in the same manner as in Example 6 except that no aluminum oxide was added in the preparation of the positive electrode active material.

Comparative Example 3

A non-aqueous electrolyte secondary battery of Comparative Example 3 was prepared in the same manner as in Example 1 except that the zirconium oxide was replaced by a chrome oxide in the preparation of the positive electrode active material.

Comparative Example 4

A non-aqueous electrolyte secondary battery of Comparative Example 4 was prepared in the same manner as in Example 1 except that the zirconium oxide was replaced by a zinc oxide in the preparation of the positive electrode active material.

Comparative Example 5

A non-aqueous electrolyte secondary battery of Comparative Example 5 was prepared in the same manner as in Example 1 except that the zirconium oxide was replaced by a strontium oxide in the preparation of the positive electrode active material.

Comparative Example 6

A non-aqueous electrolyte secondary battery of Comparative Example 6 was prepared in the same manner as in Example 1 except that the zirconium oxide was replaced by a niobium oxide in the preparation of the positive electrode active material.

Comparative Example 7

A non-aqueous electrolyte secondary battery of Comparative Example 7 was prepared in the same manner as in Comparative Example 1 except that the methyl trimethylacetate was replaced by diethyl carbonate (DEC).

Comparative Example 8

A non-aqueous electrolyte secondary battery of Comparative Example 8 was prepared in the same manner as in Comparative Example 2 except that the methyl trimethylacetate was replaced by diethyl carbonate (DEC).

Comparative Example 9

A non-aqueous electrolyte secondary battery of Comparative Example 9 was prepared in the same manner as in Comparative Example 1 except that the methyl trimethylacetate was replaced by ethyl methyl carbonate (EMC).

Comparative Example 10

A non-aqueous electrolyte secondary battery of Comparative Example 10 was prepared in the same manner as in Comparative Example 1 except that the methyl trimethylacetate was replaced by dimethyl carbonate (DMC).

Comparative Example 11

A non-aqueous electrolyte secondary battery of Comparative Example 11 was prepared in the same manner as in Comparative Example 1 except that the methyl trimethylacetate was replaced by methyl propionate (MP).

Comparative Example 12

A non-aqueous electrolyte secondary battery of Comparative Example 12 was prepared in the same manner as in Comparative Example 1 except that the methyl trimethylacetate was replaced by methyl isobutyrate (MIB).

Comparative Example 13

A non-aqueous electrolyte secondary battery of Comparative Example 13 was prepared in the same manner as in Comparative Example 3 except that the methyl trimethylacetate was replaced by diethyl carbonate (DEC).

Comparative Example 14

A non-aqueous electrolyte secondary battery of Comparative Example 14 was prepared in the same manner as in Comparative Example 4 except that the methyl trimethylacetate was replaced by diethyl carbonate (DEC).

Comparative Example 15

A non-aqueous electrolyte secondary battery of Comparative Example 15 was prepared in the same manner as in Comparative Example 5 except that the methyl trimethylacetate was replaced by diethyl carbonate (DEC).

Comparative Example 16

A non-aqueous electrolyte secondary battery of Comparative Example 16 was prepared in the same manner as in Comparative Example 6 except that the methyl trimethylacetate was replaced by diethyl carbonate (DEC).

Comparative Example 17

A non-aqueous electrolyte secondary battery of Comparative Example 17 was prepared in the same manner as in Example 2 except that the methyl trimethylacetate was replaced by diethyl carbonate (DEC).

Comparative Example 18

A non-aqueous electrolyte secondary battery of Comparative Example 18 was prepared in the same manner as in Example 3 except that the methyl trimethylacetate was replaced by diethyl carbonate (DEC).

Comparative Example 19

A non-aqueous electrolyte secondary battery of Comparative Example 19 was prepared in the same manner as in Example 6 except that the methyl trimethylacetate was replaced by diethyl carbonate (DEC).

Comparative Example 20

A non-aqueous electrolyte secondary battery of Comparative Example 20 was prepared in the same manner as in Example 7 except that the methyl trimethylacetate was replaced by diethyl carbonate (DEC).

Comparative Example 21

A non-aqueous electrolyte secondary battery of Comparative Example 21 was prepared in the same manner as in Example 1 except that the methyl trimethylacetate was replaced by diethyl carbonate (DEC).

Comparative Example 22

A non-aqueous electrolyte secondary battery of Comparative Example 22 was prepared in the same manner as in Example 1 except that the methyl trimethylacetate was replaced by ethyl methyl carbonate (EMC).

Comparative Example 23

A non-aqueous electrolyte secondary battery of Comparative Example 23 was prepared in the same manner as in Example 1 except that the methyl trimethylacetate was replaced by dimethyl carbonate (DMC).

Comparative Example 24

A non-aqueous electrolyte secondary battery of Comparative Example 24 was prepared in the same manner as in Example 1 except that the methyl trimethylacetate was replaced by methyl propionate (MP).

Comparative Example 25

A non-aqueous electrolyte secondary battery of Comparative Example 25 was prepared in the same manner as in Example 1 except that the methyl trimethylacetate was replaced by methyl isobutyrate (MIB).

Test for High-Temperature Storage Characteristics

The batteries of Examples and Comparative Examples were charged at a constant current of 1.0 It (950 mA) until reaching 4.2V, and then charged for a total of three hours at a constant voltage of 4.2V. The batteries were stored for 96 hours in a constant temperature chamber of 80° C., and then discharged at a constant current of 1.0 It (950 mA) until reaching 2.75V so as to measure the discharge capacities. The charging and discharging were performed at a room temperature of 23° C. The capacity retention rates of the batteries were calculated by the following formula, and the obtained results are shown in Table 1 below.

capacity retention rate (%)=discharge capacity after storage/discharge capacity before storage×100

Overcharge Safety Test

The batteries of Examples and Comparative Examples were charged at a constant current of 0.6 It (570 mA) until reaching 12.0V, and then overcharged for a total of 15 hours at a constant voltage of 12.0V. The overcharge safety test was stopped at this point for the batteries which were found to have emitted smoke. On the other hand, the test was continued to the remaining batteries, which were not found to have emitted smoke, while increasing the constant current at an increment of 0.1 It (95 mA). The maximum current rate at which each battery did not emit smoke was regarded as a limiting current value. The overcharge safety test was performed at a room temperature of 23° C. The test results are shown in Table 1 below.

TABLE 1

| | different element (mol %) | layered lithium-transition metal composite oxide | solvent composition (mass ratio) | capacity retention rate (%) | limiting current value (I t) |
|---|---|---|---|---|---|
| Comparative Example 1 | — | lithium-cobalt composite oxide | EC/MTMA (30/70) | 74 | 1.1 |
| Comparative Example 2 | — | lithium-nickel composite oxide | EC/MTMA (30/70) | 68 | 0.8 |
| Comparative Example 3 | Cr (0.15) | lithium-cobalt composite oxide | EC/MTMA (30/70) | 76 | 1.2 |
| Comparative Example 4 | Zn (0.15) | lithium-cobalt composite oxide | EC/MTMA (30/70) | 76 | 1.2 |
| Comparative Example 5 | Sr (0.15) | lithium-cobalt composite oxide | EC/MTMA (30/70) | 75 | 1.0 |
| Comparative Example 6 | Nb (0.15) | lithium-cobalt composite oxide | EC/MTMA (30/70) | 74 | 1.1 |
| Example 1 | Zr (0.15) | lithium-cobalt composite oxide | EC/MTMA (30/70) | 81 | 2.1 |
| Example 2 | Mg (0.15) | lithium-cobalt composite oxide | EC/MTMA (30/70) | 81 | 2.1 |
| Example 3 | Al (0.15) | lithium-cobalt composite oxide | EC/MTMA (30/70) | 82 | 1.9 |
| Example 4 | Al (0.05) | lithium-cobalt composite oxide | EC/MTMA (30/70) | 83 | 2.0 |
| Example 5 | Al (0.5) | lithium-cobalt composite oxide | EC/MTMA (30/70) | 80 | 1.9 |
| Example 6 | Al (0.15) | lithium-nickel composite oxide | EC/MTMA (30/70) | 73 | 1.7 |
| Example 7 | Ti (0.15) | lithium-cobalt composite oxide | EC/MTMA (30/70) | 79 | 1.9 |
| Example 8 | Zr (0.05) | lithium-cobalt composite oxide | EC/MTMA (30/70) | 81 | 2.1 |
| Example 9 | Zr (0.15) Mg (0.1) | lithium-cobalt composite oxide | EC/MTMA (30/70) | 82 | 2.0 |
| Example 10 | Zr (0.15) Cr (0.05) | lithium-cobalt composite oxide | EC/MTMA (30/70) | 79 | 1.9 |
| Example 11 | Zr (0.15) | lithium-cobalt composite oxide | EC/MTMA (30/70) | 84 | 1.9 |
| Example 12 | Zr (0.15) | lithium-cobalt composite oxide | EC/MTMA (30/70) | 83 | 2.3 |
| Example 13 | Zr (0.3) | lithium-cobalt composite oxide | EC/MTMA (30/70) | 82 | 2.2 |
| Example 14 | Zr (0.5) | lithium-cobalt composite oxide | EC/MTMA (30/70) | 81 | 2.1 |
| Comparative Example 7 | — | lithium-cobalt composite oxide | EC/DEC (30/70) | 78 | 0.8 |
| Comparative Example 8 | — | lithium-nickel composite oxide | EC/DEC (30/70) | 71 | 0.5 |
| Comparative Example 9 | — | lithium-cobalt composite oxide | EC/EMC (30/70) | 80 | 0.9 |
| Comparative Example 10 | — | lithium-cobalt composite oxide | EC/DMC (30/70) | 72 | 0.9 |

TABLE 1-continued

| | different element (mol %) | layered lithium-transition metal composite oxide | solvent composition (mass ratio) | capacity retention rate (%) | limiting current value (I t) |
|---|---|---|---|---|---|
| Comparative Example 11 | — | lithium-cobalt composite oxide | EC/MP (30/70) | 71 | 0.8 |
| Comparative Example 12 | — | lithium-cobalt composite oxide | EC/MIB (30/70) | 75 | 1.1 |
| Comparative Example 13 | Cr (0.15) | lithium-cobalt composite oxide | EC/DEC (30/70) | 80 | 1.0 |
| Comparative Example 14 | Zn (0.15) | lithium-cobalt composite oxide | EC/DEC (30/70) | 81 | 0.9 |
| Comparative Example 15 | Sr (0.15) | lithium-cobalt composite oxide | EC/DEC (30/70) | 77 | 1.0 |
| Comparative Example 16 | Nb (0.15) | lithium-cobalt composite oxide | EC/DEC (30/70) | 81 | 0.9 |
| Comparative Example 17 | Mg (0.15) | lithium-cobalt composite oxide | EC/DEC (30/70) | 79 | 0.9 |
| Comparative Example 18 | Al (0.15) | lithium-cobalt composite oxide | EC/DEC (30/70) | 82 | 0.8 |
| Comparative Example 19 | Al (0.15) | lithium-nickel composite oxide | EC/DEC (30/70) | 70 | 0.5 |
| Comparative Example 20 | Ti (0.15) | lithium-cobalt composite oxide | EC/DEC (30/70) | 81 | 0.7 |
| Comparative Example 21 | Zr (0.15) | lithium-cobalt composite oxide | EC/DEC (30/70) | 79 | 0.9 |
| Comparative Example 22 | Zr (0.15) | lithium-cobalt composite oxide | EC/EMC (30/70) | 81 | 0.9 |
| Comparative Example 23 | Zr (0.15) | lithium-cobalt composite oxide | EC/DMC (30/70) | 75 | 1.0 |
| Comparative Example 24 | Zr (0.15) | lithium-cobalt composite oxide | EC/MP (30/70) | 77 | 0.8 |
| Comparative Example 25 | Zr (0.15) | lithium-cobalt composite oxide | EC/MIB (30/70) | 76 | 1.2 |

In Table 1, a limiting current of 0.5 It means that the battery emitted smoke at an overcharge of 0.6 It.

Table 1 indicates that Examples 1 to 5 and 7 to 14 are superior in capacity retention rate and limiting current to Comparative Examples 1 and 3 to 6. More specifically, Examples 1 to 5 and 7 to 14 using a layered lithium-cobalt composite oxide containing at least one of Zr, Mg, Al, and Ti and also using a non-aqueous solvent containing methyl trimethylacetate (MTMA) have capacity retention rates of 79 to 84% and limiting currents of 1.9 to 2.3 It. On the other hand, Comparative Examples 1 and 3 to 6 using a layered lithium-cobalt composite oxide not containing these elements and also using a non-aqueous solvent containing methyl trimethylacetate have capacity retention rates of 74 to 76% and limiting currents of 1.0 to 1.2 It.

Table 1 further indicates that Example 6 is superior in capacity retention rate and limiting current to Comparative Example 2. More specifically, Example 6 using an Al-containing layered lithium-nickel composite oxide and also using a methyl trimethylacetate-containing non-aqueous solvent has a capacity retention rate of 73% and a limiting current of 1.7 It. On the other hand, Comparative Example 2 using a layered lithium-nickel composite oxide not containing Al and also using a methyl trimethylacetate-containing non-aqueous solvent has a capacity retention rate of 68% and a limiting current of 0.8 It.

These results are considered to be due to the following reasons. The addition of at least one of Zr, Mg, Al, and Ti to the layered lithium-transition metal composite oxide improves its structure stability. Furthermore, the tertiary carboxylic acid ester contained in the non-aqueous electrolyte functions to reduce the reaction between the non-aqueous electrolyte and the positive electrode active material to which the different element has been added. These effects act synergistically so as to dramatically improve the high-temperature storage characteristics and the safety against overcharge due to high-rate charging. In contrast, the use of the layered lithium-transition metal composite oxide containing none of Zr, Mg, Al, and Ti does not provide the synergistic effect, thus failing to improve the high-temperature storage characteristics or the safety against overcharge due to high-rate charging.

Table 1 further indicates that the batteries using a layered lithium-nickel composite oxide (Example 6 and Comparative Example 2) are inferior in high-temperature storage characteristics and safety against overcharge due to high-rate charging to the batteries using a lithium-cobalt composite oxide (Examples 1 to 5 and 7 to 14 and Comparative Examples 1 and 3 to 6).

These results are considered to be due to the following reason. The layered lithium-cobalt composite oxide has higher structure stability than the layered lithium-nickel composite oxide, thus excelling in high-temperature storage characteristics and safety against overcharge due to high-rate charging.

Table 1 further indicates that Examples 1 to 5 and 7 to 14 are superior in limiting current to Comparative Examples 7 and 9 to 16. More specifically, Examples 1 to 5 and 7 to 14 using a layered lithium-cobalt composite oxide containing at least one of Zr, Mg, Al, and Ti and also using a methyl trimethylacetate-containing non-aqueous solvent have limiting currents of 1.9 to 2.3 It. On the other hand, Comparative Examples 7 and 9 to 16 using a layered lithium-cobalt composite oxide containing none of the elements and also using a non-aqueous solvent not containing methyl trimethylacetate have limiting currents of 0.8 to 1.1 It.

Table 1 further indicates that Example 6 is superior in limiting current to Comparative Example 8. More specifically, Example 6 using an Al-containing layered lithium-nickel composite oxide and also using a methyl trimethylacetate-containing non-aqueous solvent has a limiting current of 1.7 It. On the other hand, Comparative Example 8 using a layered lithium-nickel composite oxide not containing Al and also using a non-aqueous solvent not containing methyl trimethylacetate has a limiting current of 0.5 It.

These results are considered to be due to the following reasons. The addition of at least one of Zr, Mg, Al, and Ti to the layered lithium-transition metal composite oxide improves its structure stability. Furthermore, the tertiary carboxylic acid ester contained in the non-aqueous electrolyte functions to reduce the reaction between the non-aqueous electrolyte and the positive electrode active material to which the different element has been added. These effects act synergistically so as to dramatically improve the safety against overcharge due to high-rate charging. In contrast, the use of the layered lithium-transition metal composite oxide containing none of Zr, Mg, Al, and Ti and the use of the non-aqueous solvent not containing the tertiary carboxylic acid ester do not provide the synergistic effect, thus failing to improve the safety against overcharge due to high-rate charging.

Table 1 further indicates that Examples 1 to 5 and 7 to 14 are superior in limiting current to Comparative Examples 17, 18, and 20 to 25. More specifically, Examples 1 to 5 and 7 to 14 using a layered lithium-cobalt composite oxide containing at least one of Zr, Mg, Al, and Ti and also using a methyl trimethylacetate-containing non-aqueous solvent have limiting currents of 1.9 to 2.3 It. On the other hand, Comparative Examples 17, 18, and 20 to 25 using a layered lithium-cobalt composite oxide containing at least one of Zr, Mg, Al, and Ti and also using a non-aqueous solvent not containing methyl trimethylacetate have limiting currents of 0.7 to 1.2 It.

Table 1 further indicates that Example 6 is superior in limiting current to Comparative Example 19. More specifically, Example 6 using an Al-containing layered lithium-nickel composite oxide and also using a methyl trimethylacetate-containing non-aqueous solvent has a limiting current of 1.7 It. On the other hand, Comparative Example 19 using a layered lithium-nickel composite oxide containing Al and also using a non-aqueous solvent not containing methyl trimethylacetate has a limiting current of 0.5 It.

These results are considered to be due to the following reasons. The addition of at least one of Zr, Mg, Al, and Ti to the layered lithium-transition metal composite oxide improves its structure stability. Furthermore, the tertiary carboxylic acid ester contained in the non-aqueous electrolyte functions to reduce the reaction between the non-aqueous electrolyte and the positive electrode active material to which the different element has been added. These effects act synergistically so as to dramatically improve the safety against overcharge due to high-rate charging. In contrast, the use of the layered lithium-transition metal composite oxide containing one of Zr, Mg, Al, and Ti and the use of the non-aqueous solvent not containing the tertiary carboxylic acid ester do not provide the synergistic effect, thus failing to improve the safety against overcharge due to high-rate charging.

Example 15

A non-aqueous electrolyte secondary battery of Example 15 was prepared in the same manner as in Example 1 except for using as the non-aqueous solvent a mixed solvent of 40 parts by mass of ethylene carbonate (EC), 57 parts by mass of ethyl methyl carbonate (EMC), and 3 parts by mass of methyl trimethylacetate (MTMA).

Example 16

A non-aqueous electrolyte secondary battery of Example 16 was prepared in the same manner as in Example 1 except for the following. The non-aqueous solvent was a mixed solvent of 50 parts by mass of ethylene carbonate (EC), 47 parts by mass of propylene carbonate (PC), and 3 parts by mass of methyl trimethylacetate (MTMA). Furthermore, 1% by mass of vinyl ethylene carbonate (VEC) was added to the non-aqueous electrolyte, and $LiPF_6$ was made to have a concentration of 1.1 mol/L. The vinyl ethylene carbonate was added to suppress the reductive degradation of propylene carbonate.

Example 17

A non-aqueous electrolyte secondary battery of Example 17 was prepared in the same manner as in Example 1 except for using as the non-aqueous solvent a mixed solvent of 40 parts by mass of ethylene carbonate (EC), 50 parts by mass of ethyl methyl carbonate (EMC), and 10 parts by mass of methyl trimethylacetate (MTMA).

Example 18

A non-aqueous electrolyte secondary battery of Example 18 was prepared in the same manner as in Example 1 except for using as the non-aqueous solvent a mixed solvent of 30 parts by mass of ethylene carbonate (EC), 20 parts by mass of propylene carbonate (PC), and 50 parts by mass of methyl trimethylacetate (MTMA).

Example 19

A non-aqueous electrolyte secondary battery of Example 19 was prepared in the same manner as in Example 1 except for using as the non-aqueous solvent a mixed solvent of 30 parts by mass of ethylene carbonate (EC), 10 parts by mass of propylene carbonate (PC), and 60 parts by mass of methyl trimethylacetate (MTMA).

Example 20

A non-aqueous electrolyte secondary battery of Example 20 was prepared in the same manner as in Example 1 except that the methyl trimethylacetate (MTMA) was replaced by ethyl trimethylacetate (ETMA) expressed by Chemical Formula 4 below.

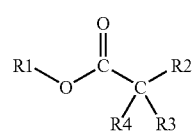

Chemical Formula 4 where R1 is an ethyl group, and R2 to R4 are methyl groups.

Example 21

A non-aqueous electrolyte secondary battery of Example 21 was prepared in the same manner as in Example 1 except that the methyl trimethylacetate (MTMA) was replaced by methyl-2,2-dimethylbutyrate expressed by Chemical Formula 5 below.

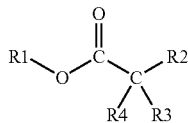

Chemical Formula 5 where R1 to R3 are methyl groups, and R4 is an ethyl group.

Example 22

A non-aqueous electrolyte secondary battery of Example 22 was prepared in the same manner as in Example 1 except for using as the non-aqueous solvent a mixed solvent of 20 parts by mass of ethylene carbonate (EC) and 80 parts by mass of methyl trimethylacetate (MTMA).

Comparative Example 26

A non-aqueous electrolyte secondary battery of Comparative Example 26 was prepared in the same manner as in Example 1 except for using as the non-aqueous solvent a mixed solvent of 40 parts by mass of ethylene carbonate (EC), 58 parts by mass of ethyl methyl carbonate (EMC), and 2 parts by mass of methyl trimethylacetate (MTMA).

Comparative Example 27

A non-aqueous electrolyte secondary battery of Comparative Example 27 was prepared in the same manner as in Example 1 except for the following. The non-aqueous solvent was a mixed solvent of 50 parts by mass of ethylene carbonate (EC), 48 parts by mass of propylene carbonate (PC), and 2 parts by mass of methyl trimethylacetate (MTMA) Furthermore, 1% by mass of vinyl ethylene carbonate (VEC) was added to the non-aqueous electrolyte, and $LiPF_6$ was made to have a concentration of 1.1 mol/L.

Comparative Example 28

A non-aqueous electrolyte secondary battery of Comparative Example 28 was prepared in the same manner as in Example 1 except for using as the non-aqueous solvent a mixed solvent of 15 parts by mass of ethylene carbonate (EC) and 85 parts by mass of methyl trimethylacetate (MTMA).

Comparative Example 29

A non-aqueous electrolyte secondary battery of Comparative Example 29 was prepared in the same manner as in Example 1 except for using as the non-aqueous solvent a mixed solvent of 15 parts by mass of ethylene carbonate (EC) and 85 parts by mass of ethyl trimethylacetate (ETMA).

The batteries of Examples 1 and 15 to 22 and of Comparative Examples 26 to 29 were subjected to the test for high-temperature storage characteristics and the overcharge safety test under the aforementioned conditions. The results are shown in Table 2 below.

TABLE 2

| | solvent composition (mass ratio) | lithium salt concentration (mol/L) | capacity retention rate (%) | limiting current value (I t) |
|---|---|---|---|---|
| Comparative Example 26 | EC/EMC/MTMA (40/58/2) | 1.0 | 76 | 0.9 |
| Comparative Example 27 | EC/PC/MTMA (50/48/2) | 1.1 | 74 | 1.3 |
| Example 15 | EC/EMC/MTMA (40/57/3) | 1.0 | 78 | 1.8 |
| Example 16 | EC/PC/MTMA (50/47/3) | 1.1 | 76 | 2.0 |
| Example 17 | EC/EMC/MTMA (40/50/10) | 1.0 | 79 | 1.9 |
| Example 18 | EC/PC/MTMA (30/20/50) | 1.0 | 82 | 2.3 |
| Example 19 | EC/PC/MTMA (30/10/60) | 1.0 | 81 | 2.2 |
| Example 1 | EC/MTMA (30/70) | 1.0 | 81 | 2.1 |
| Example 20 | EC/ETMA (30/70) | 1.0 | 84 | 2.0 |
| Example 21 | EC/methyl-2,2-dimethylbutyrate (30/70) | 1.0 | 77 | 1.7 |
| Example 22 | EC/MTMA (20/80) | 1.0 | 80 | 1.6 |
| Comparative Example 28 | EC/MTMA (15/85) | 1.0 | 69 | 1.7 |
| Comparative Example 29 | EC/ETMA (15/85) | 1.0 | 66 | 1.7 |

Table 2 indicates that using ethyl trimethylacetate (ETMA) or methyl-2,2-dimethylbutyrate as the tertiary carboxylic acid ester provides the same effect as using methyl trimethylacetate (MTMA) (see Examples 1, 20, and 21).

Table 2 further indicates that Comparative Examples 26 and 27 are inferior in limiting current to Examples 1 and 15 to 22. More specifically, Comparative Examples 26 and 27 using a non-aqueous electrolyte containing 2% by mass of the tertiary carboxylic acid ester have limiting currents of 0.9 It and 1.3 It, respectively. On the other hand, Examples 1 and 15 to 22 using a non-aqueous electrolyte containing 3 to 80% by mass of the tertiary carboxylic acid ester have limiting currents of 1.6 to 2.3 It.

Table 2 further indicates that Comparative Examples 28 and 29 are far inferior in capacity retention rate to Examples 1 and 15 to 22. More specifically, Comparative Examples 28 and 29 using a non-aqueous electrolyte containing 85% by mass of the tertiary carboxylic acid ester have capacity retention rates of 69% and 66%, respectively. On the other hand, Examples 1 and 15 to 22 using a non-aqueous electrolyte containing 3 to 80% by mass of the tertiary carboxylic acid ester have capacity retention rates of 76 to 84%.

These results are considered to be due to the following reasons. When the tertiary carboxylic acid ester content is too low, it is impossible to sufficiently improve the safety against overcharge due to high-rate charging. When content is too high, on the other hand, the tertiary carboxylic acid ester reacts with the electrode and is decomposed, thereby reducing the high-temperature storage characteristics. Therefore, the tertiary carboxylic acid ester content is preferably 3 to 80% by mass based on the total mass of the non-aqueous solvent.

Additions

Acceptable examples of the non-aqueous solvent to be used together with the tertiary carboxylic acid ester include carbonates, lactones, ethers, and esters. Preferable among them are carbonates and lactones, and more preferable among them are cyclic carbonates. Specific examples of the solvent include ethylene carbonate, propylene carbonate, dimethyl carbonate, ethyl methyl carbonate, diethyl carbonate, γ-butyrolactone, γ-valerolactone, 1,2-dimethoxyethane, tetrahydrofuran, and 1,4-dioxane.

Specific examples of the electrolyte salt include $LiClO_4$, $LiPF_6$, $LiBF_4$, $LiAsF_6$, $LiCF_3SO_3$, $LiN(CF_3SO_2)_2$, and $LiN(C_2F_6SO_2)_2$—. The electrolyte salt preferably has a concentration of 0.5 to 2.0 mol/L. The addition of $LiCF_3SO_3$ in the range of 0.01 to 0.5 mol/L improves continuous charge characteristics and trickle charging characteristics.

The different element (Mg, Al, Zr, or Ti) can be added to the layered lithium-transition metal composite oxide by various methods other than the method described in Examples. For example, it is possible to allow the different element to enter into solid solution in the transition metal salt by, for example, crystallization; to dry-blend a compound of the different element with a transition metal compound; or to subject the transition metal salt to wet ultrafine grinding and spray drying.

The layered lithium-transition metal composite oxide is preferably in the form of spherical or elliptical particles. The different element (Mg, Al, Zr, or Ti) is preferably uniformly dispersed in the layered lithium-transition metal composite oxide particles.

When the layered lithium-transition metal composite oxide is in the form of spherical or elliptical particles, the battery has excellent electrical characteristics and high safety under the following conditions. The particle size distribution measured using a laser diffraction apparatus indicates that D50 (the particle size when the accumulated particle amount is 50%) is 3 to 10 μm, D10 is 1 μm or more, and D90 is less than 30 μm.

Examples of the negative electrode active material include at least one of a carbonaceous material, a metal oxide, pure tin, a tin alloy, a tin compound, pure cobalt, a cobalt alloy, a cobalt compound, pure silicon, a silicon alloy, and a silicon compound, all of which are capable of absorbing and desorbing lithium ions. In terms of improving cycle characteristics, it is preferable to use graphite the surface of which has been non-crystallized.

INDUSTRIAL APPLICABILITY

As described hereinbefore, the present invention provides a non-aqueous electrolyte secondary battery having excellent high-temperature storage characteristics and high safety against overcharge due to high-rate charging, thus providing high industrial applicability.

What is claimed is:

1. A non-aqueous electrolyte secondary battery comprising:
    a positive electrode containing a positive electrode active material;
    a negative electrode containing a negative electrode active material;
    a non-aqueous electrolyte containing a non-aqueous solvent and an electrolyte salt; wherein
    the positive electrode active material contains a layered lithium-transition metal composite oxide containing at least one element selected from the group consisting of Mg, Al, Ti, and Zr; and
    the non-aqueous electrolyte contains 3 to 80% by mass of a tertiary carboxylic acid ester expressed by Chemical Formula 2 below, based on the total mass of the non-aqueous solvent:

Chemical Formula 2

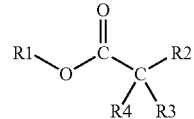

where R1 to R4 are independent of each other and each represents an alkyl group having 4 or less carbon atoms and being able to be branched;
    wherein the layered lithium-transition metal composite oxide is at least one selected from the group consisting of a lithium-cobalt composite oxide, a lithium-nickel composite oxide, a lithium-cobalt-nickel composite oxide, a lithium-manganese-nickel composite oxide, and a lithium-cobalt-manganese-nickel composite oxide; and
    wherein the at least one element selected from the group consisting of Mg, Al, Ti and Zr contained in the layered lithium-transition metal composite oxide is 0.005 to 0.8% in total, based on the total mole number of the transition metal and the element contained in the layered lithium-transition metal composite oxide.

2. The non-aqueous electrolyte secondary battery of claim 1, wherein the tertiary carboxylic acid ester is methyl trimethylacetate and/or ethyl trimethylacetate.

3. The non-aqueous electrolyte secondary battery of claim 1, wherein the positive electrode active material contains at least 10% by mass of the layered lithium-transition metal composite oxide based on the total mass of the positive electrode active material.

4. The non-aqueous electrolyte secondary battery of claim 3, wherein the layered lithium-transition metal composite oxide is in a form of spherical or elliptical particles.

5. The non-aqueous electrolyte secondary battery of claim 4, wherein the non-aqueous solvent contains a cyclic carbonate.

6. The non-aqueous electrolyte secondary battery of claim 5, wherein the negative electrode active material is graphite a surface of which has been non-crystallized.

7. The non-aqueous electrolyte secondary battery of claim 1, wherein the layered lithium-transition metal composite oxide is in a form of spherical or elliptical particles.

8. The non-aqueous electrolyte secondary battery of claim 1, wherein the negative electrode active material is graphite a surface of which has been non-crystallized.

* * * * *

UNITED STATES PATENT AND TRADEMARK OFFICE
CERTIFICATE OF CORRECTION

PATENT NO. : 7,709,156 B2 Page 1 of 1
APPLICATION NO. : 12/238772
DATED : May 4, 2010
INVENTOR(S) : Kentaro Takahashi It is certified that error appears in the above-identified patent and that said Letters Patent is hereby corrected as shown below:

Claim 1, line 29 and 30, column 18 should read as follows:
--0.005 to 0.8 mol%--

Signed and Sealed this

Twentieth Day of July, 2010

David J. Kappos
*Director of the United States Patent and Trademark Office*